UNITED STATES PATENT OFFICE.

WALTER B. PRICE, OF SAN FRANCISCO, CALIFORNIA.

PROCESS OF PURIFYING ILLUMINATING-OILS.

SPECIFICATION forming part of Letters Patent No. 522,028, dated June 26, 1894.

Application filed September 14, 1893. Serial No. 485,456. (No specimens.)

*To all whom it may concern:*

Be it known that I, WALTER B. PRICE, a citizen of the United States, residing at San Francisco, county of San Francisco, and State of California, have invented a new and useful Process for the Purification of Illuminating-Oils, of which the following is a full, clear, and exact description.

Certain oils are valueless for illuminating purposes by reason of containing sulphur as an impurity. The oil known as Lima oil, obtained in Ohio, is an example of this character of oil. This impurity prevents the oil from burning freely, on account of the wick becoming clogged; also the chimney is clouded from the deposits of material upon its surface, and objectionable odors are evolved during burning.

My process has for its object to free the oil from this impurity and render it of value as an illuminant; and it consists essentially of a treatment of the oil to be purified with nitric acid or a nitrogen compound, which combines with the sulphur, breaking up the sulphur compound, precipitating a portion of the sulphur in the form of an organic compound and converting a portion into sulphuric acid. However, in this treatment, certain nitro compounds are formed, which give to the oil a color which renders it unmarketable to a great extent, and also, if burned, the nitro compounds will clog the wick and emit an odor which, while not the odor of sulphur, still is disagreeable. I correct this by my improved process, which consists in redistilling the oil, after the nitric treatment, with sulphuric acid, sufficient in quantity to decompose the nitric compounds formed.

The preferred manner of carrying out my process is as follows: The crude oil is distilled in the regular manner now in use in oil refineries, the distillate is then treated with nitric acid (preferably that known as "red" or "fuming") strong nitrous acid, nitric oxide or nitric per-oxide, in a suitable vessel either in a cold state or the vessel may be heated. The action of these reagents upon the oil breaks up the sulphur compounds, precipitating a portion of the sulphur in the form of an organic compound, and converting a portion with sulphuric acid and nitro compounds being also formed. The amount of nitric acid to be used should be between five and six times (by weight) the weight of the sulphur present in the oil to be treated, said amount of sulphur having been previously determined by analysis. Care should be taken to prevent the addition of more acid than sufficient to oxidize the sulphur present, as any considerable excess of the acid over that amount would tend to attack the body of the oil and thus injure its burning qualities. Should either of the above mentioned chemicals be used in place of nitric acid, the quantity employed should be the chemical equivalent of the nitric acid, so far as the oxygen is concerned, as above mentioned. The oil, after the treatment just mentioned, is then washed with water and an alkaline solution to remove all the free nitric acid and vapors. The oil is then again placed in the still and distilled with the addition of sulphuric acid, the sulphuric acid decomposing the nitro compounds formed. The oil is then washed with sulphuric acid and alkali in the ordinary manner. By the hereinbefore described process I have obtained from oils containing sulphur free burning oils which neither clog the wick, cloud the chimney, nor emit an offensive odor, and which are of the proper and desirable color.

In place of treating the distillate with nitric acid, the crude oil can be treated, the other steps of the process being as indicated. Care should be taken that after the treatment of the oil with nitric acid, nitrous acid or nitric peroxide as above described, that all the gummy precipitates and free acid must be drawn off, and the oil washed to free it as much as possible of the acid before it is distilled with sulphuric acid.

Having now fully described my invention, what I claim, and desire to protect by Letters Patent, is—

1. A new process of purifying oils containing sulphur, which consists in treating the oil with nitric acid, nitrous acid or nitric peroxide and distilling the oil so treated with sulphuric acid.

2. A new process of purifying oils containing sulphur, which consists in distilling the oil, treating the distillate with nitric acid, nitrous acid or nitric peroxide and distilling the oil so treated with sulphuric acid.

In testimony of which invention I have hereunto set my hand.

WALTER B. PRICE.

Witnesses:
   HOLLAND SMITH,
   GEO. LOOMIS.